US008682980B2

(12) United States Patent
Fernandez et al.

(10) Patent No.: US 8,682,980 B2
(45) Date of Patent: Mar. 25, 2014

(54) PROVIDING CHAT HISTORIES TO INVITEES

(75) Inventors: Diana Maria Fernandez, Cedar Park, TX (US); Rene Ruben Martinez, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1719 days.

(21) Appl. No.: 11/538,109

(22) Filed: Oct. 3, 2006

(65) Prior Publication Data

US 2008/0080679 A1    Apr. 3, 2008

(51) Int. Cl.
G06F 15/16    (2006.01)
H04B 7/00    (2006.01)
H04M 1/00    (2006.01)

(52) U.S. Cl.
USPC ........... 709/206; 709/203; 709/207; 455/519; 455/556.2

(58) Field of Classification Search
USPC ......... 379/67.1, 88.17, 202.01; 370/266, 261, 370/270; 455/519, 556.2; 709/206, 203, 709/207
See application file for complete search history.

(56) References Cited

U.S. PATENT DOCUMENTS

| | | | |
|---|---|---|---|
| 6,212,548 B1* | 4/2001 | DeSimone et al. ............ | 709/204 |
| 7,426,192 B2* | 9/2008 | Amano et al. ................. | 370/261 |
| 7,639,634 B2* | 12/2009 | Shaffer et al. ................. | 370/266 |
| 7,716,289 B2* | 5/2010 | Malik ............................ | 709/206 |
| 8,015,247 B1* | 9/2011 | Curry ............................ | 709/205 |
| 8,150,922 B2* | 4/2012 | Griffin et al. ................. | 709/206 |
| 8,244,807 B2* | 8/2012 | Malik ............................ | 709/204 |
| 8,254,890 B2* | 8/2012 | Hung et al. ................. | 455/412.1 |
| 2001/0006889 A1 | 7/2001 | Kraft | |
| 2003/0076353 A1* | 4/2003 | blackstock et al. ........... | 345/751 |
| 2004/0054737 A1* | 3/2004 | Daniell ......................... | 709/206 |
| 2004/0078435 A1* | 4/2004 | Dunbar et al. ................ | 709/206 |
| 2004/0078444 A1* | 4/2004 | Malik ............................ | 709/206 |
| 2005/0053214 A1* | 3/2005 | Reding et al. ............ | 379/202.01 |
| 2005/0132009 A1* | 6/2005 | Solie ............................. | 709/206 |
| 2006/0161853 A1* | 7/2006 | Chen et al. ................... | 715/758 |
| 2007/0143423 A1* | 6/2007 | Kieselbach et al. .......... | 709/206 |
| 2007/0288560 A1* | 12/2007 | Bou-Ghannam et al. ..... | 709/204 |
| 2007/0300169 A1* | 12/2007 | Jones et al. ................... | 715/764 |
| 2008/0028031 A1* | 1/2008 | Bailey et al. ................. | 709/207 |
| 2008/0154967 A1* | 6/2008 | Heikes et al. .............. | 707/104.1 |
| 2008/0270916 A1* | 10/2008 | Chen et al. ................... | 715/758 |
| 2008/0320086 A1* | 12/2008 | Callanan et al. ............. | 709/206 |

(Continued)

FOREIGN PATENT DOCUMENTS

EP    1109415 A2 *  6/2001
EP    1209849 A2 *  5/2002

OTHER PUBLICATIONS

China Patent Office office action dated Jan. 22, 2010.
U.S. Appl. No. 11/260,565, filed Oct. 27, 2005, Bosma et al.

(Continued)

*Primary Examiner* — Lisa Hashem
(74) *Attorney, Agent, or Firm* — Yee & Associates, P.C.; Steven L. Bennett

(57) ABSTRACT

A computer implemented method, apparatus, and computer usable program code for managing messages for an instant messaging conversation. A determination is made as to whether the selected party should receive the messages already exchanged in the instant messaging conversation in response to a user input during the instant messaging conversation with respect to a selected party. The messages are sent to the selected party in response to a determination that the selected party should receive the plurality of messages.

25 Claims, 5 Drawing Sheets

(56) References Cited

U.S. PATENT DOCUMENTS

| | | | |
|---|---|---|---|
| 2009/0006548 A1* | 1/2009 | Ramanathan et al. | 709/204 |
| 2009/0138520 A1* | 5/2009 | Burckart et al. | 707/104.1 |
| 2009/0313703 A1* | 12/2009 | Mao | 726/27 |
| 2010/0130180 A1* | 5/2010 | Lim | 455/414.1 |
| 2010/0169435 A1* | 7/2010 | O'Sullivan et al. | 709/206 |
| 2011/0029898 A1* | 2/2011 | Malik | 715/758 |
| 2011/0153735 A1* | 6/2011 | Eisenberg | 709/203 |
| 2011/0167122 A1* | 7/2011 | Groves et al. | 709/206 |
| 2011/0202611 A1* | 8/2011 | Malik et al. | 709/206 |
| 2013/0007163 A1* | 1/2013 | O'Brien et al. | 709/206 |
| 2013/0018969 A1* | 1/2013 | Samdadiya et al. | 709/206 |
| 2013/0080558 A1* | 3/2013 | Moudy et al. | 709/206 |
| 2013/0185363 A1* | 7/2013 | DeLuca et al. | 709/206 |

OTHER PUBLICATIONS

U.S. Appl. No. 11/334,673, filed Jan. 18, 2006, Keohane et al.
U.S. Appl. No. 11/301,102, filed Feb. 23, 2006, Allen et al.
"Multi User Chat", pp. 1-10, retrieved Jul. 12, 2006. http://www.jivesoftware.org/builds/smack/docks/latest/documentation/extensions/muc.html.
Patterson, "[Standards-JIG] Re: Converting a chat session into a conference" Jul. 2004, pp. 1-3, retrieved Jul. 12, 2006. http://mailman.jabber.org/pipermail/standards-jig-2004-July/005872.html.

* cited by examiner

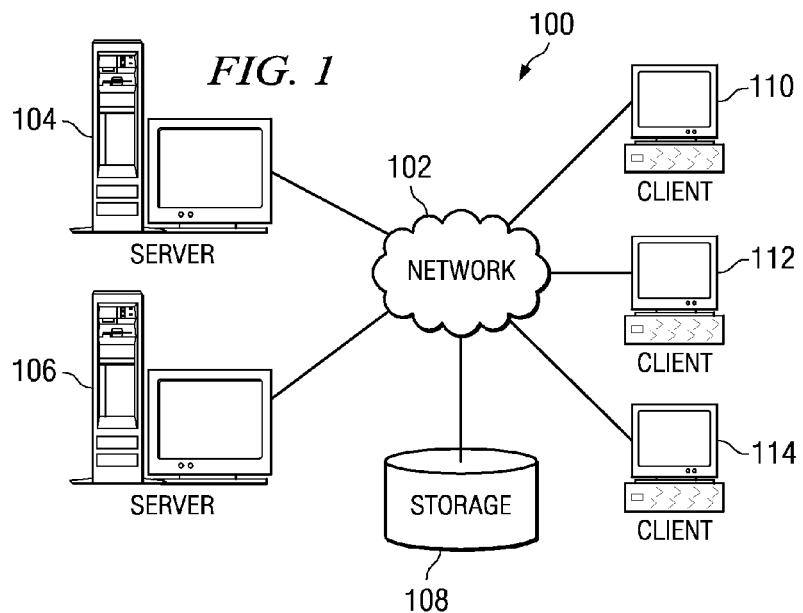

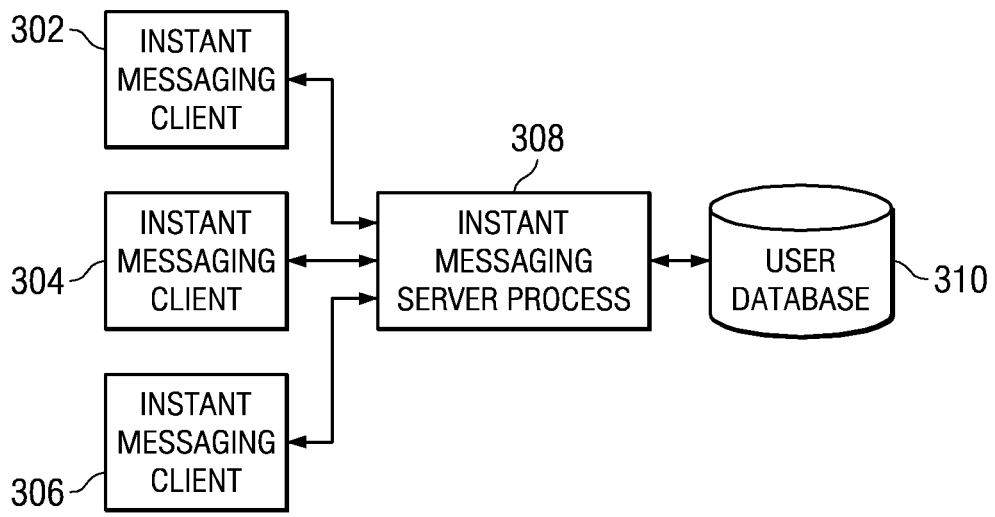
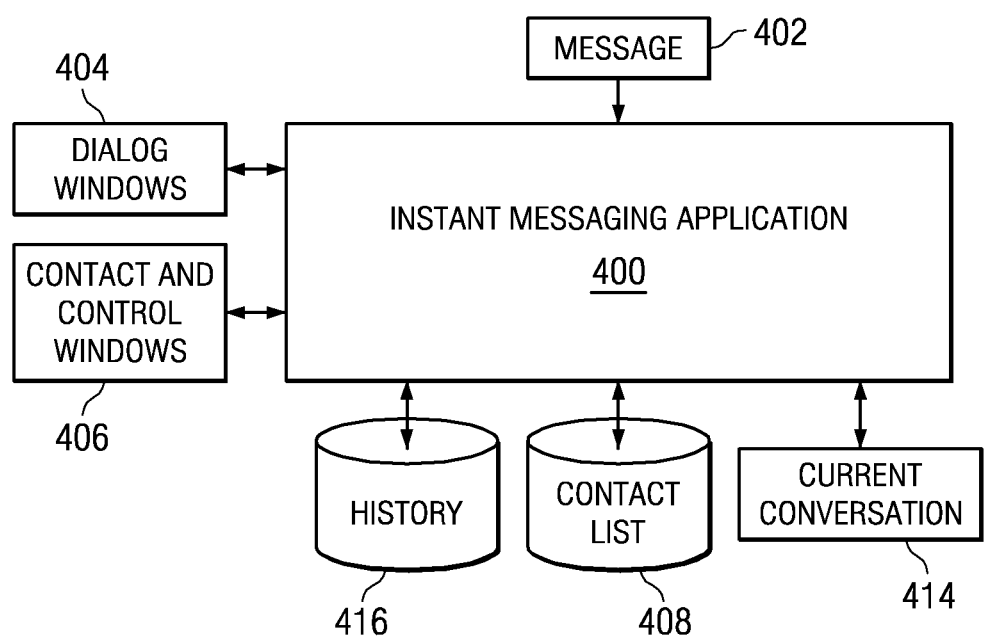

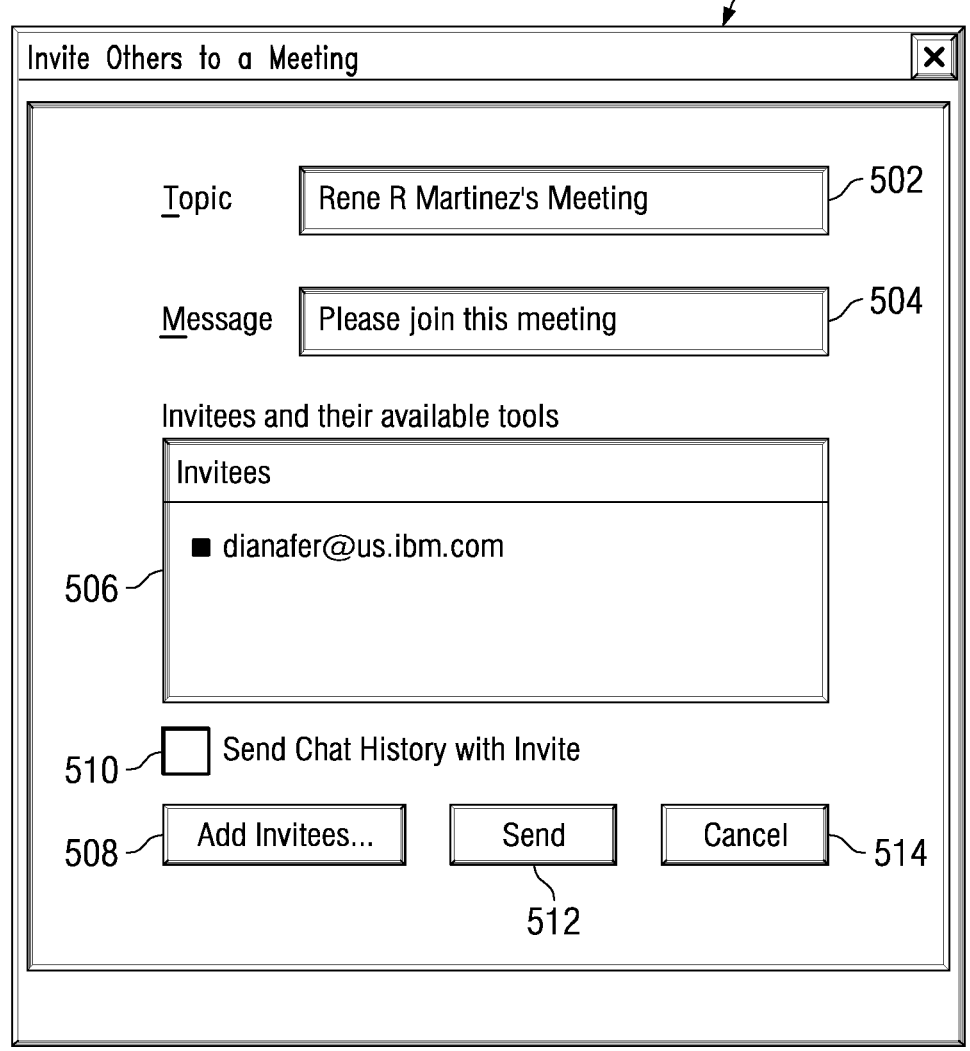

PROVIDING CHAT HISTORIES TO INVITEES

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program product for managing chat histories.

2. Description of the Related Art

Instant messaging is an online chat medium, allowing users to communicate with each other and collaborate in real-time over a network of data processing systems. Instant messaging is commonly used over the Internet. Instant messaging applications monitor and report the status of users that have established each other as online contacts. This information is typically presented to a user in a window. Instant messaging applications also are often used by users conducting business. By utilizing instant messaging, business users can view each other's availability and initiate conversations with colleagues or customers when a desired contact becomes available. A conversation is an exchange of text messages between two or more parties.

Typically, with instant messaging applications, communications between users are initiated by users selecting the name of the person with whom they desire to communicate. Then, the users type messages in a dialog box in the window and press "send". These messages appear instantly on the other selected recipient's computer.

Until now, instant messaging has been developed largely for home users, but used by home and business users alike. Instant messaging allows an organization to deploy and utilize this "need-to-have" technology in a business setting.

During an ongoing conversation between two or more parties using an instant messaging application, the parties sometimes find it desirable to add another party or participant during the conversation. For example, if two parties are discussing a product and questions regarding technical aspects of the product are encountered, a third party, such as a technical expert, may be desired. In such a case, the third party is invited to join the conversation. When such a third party is invited during a conversation using an instant messaging application, sometimes it is desirable to make the chat history available to that party. In the case of the technical questions, it may be desirable to make the history available to that third party to allow that party to understand the context of the questions.

Currently, the solution is to copy the prior messages sent between the parties and paste that chat history back into the current conversation. Such a feature is often cumbersome depending on the amount of prior messages present in the conversation. Further, pasting the history into the current conversation repeats the messages for all of the participants who have been present prior to the third person joining the conversation. Thus, this type of procedure for providing a history to a third party invitee that joins the conversation while it is occurring is undesirable.

SUMMARY OF THE INVENTION

The present invention provides a computer implemented method, apparatus, and computer usable program code for managing messages for an instant messaging conversation. A determination is made as to whether the selected party should receive the messages already exchanged in the instant messaging conversation in response to a user input during the instant messaging conversation with respect to a selected party. The messages are sent to the selected party in response to a determination that the selected party should receive the plurality of messages.

In the illustrative embodiments, the user input is an invitation to the selected party to join the instant messaging conversation. When the determination is made as to whether the selected party should receive messages already exchanged in the instant messaging conversation in response to a user input during the instant messaging conversation with respect to a selected party, the determination is whether an indication to send a history of the instant messaging conversation is present, in one illustrative embodiment.

When the messages are sent to the selected party in response to a determination that the selected party should receive the messages, the messages are sent to the selected party if the selected party joins the instant messaging conversation in one depicted example.

Further, in another embodiment, the indication is made in a dialog window used to invite parties to the instant messaging conversation. The user input may be a selection of the selected party to receive the messages. The selection of the selected party may be made using a menu in an instant messaging application. The messages are all of the messages already exchanged during the instant messaging conversation in another illustrative embodiment. The determining step and the sending step may be performed by an instant messaging application on a client in these examples.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a network of data processing systems in which illustrative embodiments may be implemented;

FIG. 2 is a block diagram of a data processing system in which illustrative embodiments may be implemented;

FIG. 3 is a block diagram illustrating components used in an instant messaging system in accordance with an illustrative embodiment;

FIG. 4 is a diagram illustrating components used in an instant messaging system in accordance with an illustrative embodiment;

FIG. 5 is a diagram of a dialog window in accordance with an illustrative embodiment;

DETAILED DESCRIPTION OF THE PREFERRED EMBODIMENT

Figure 6:
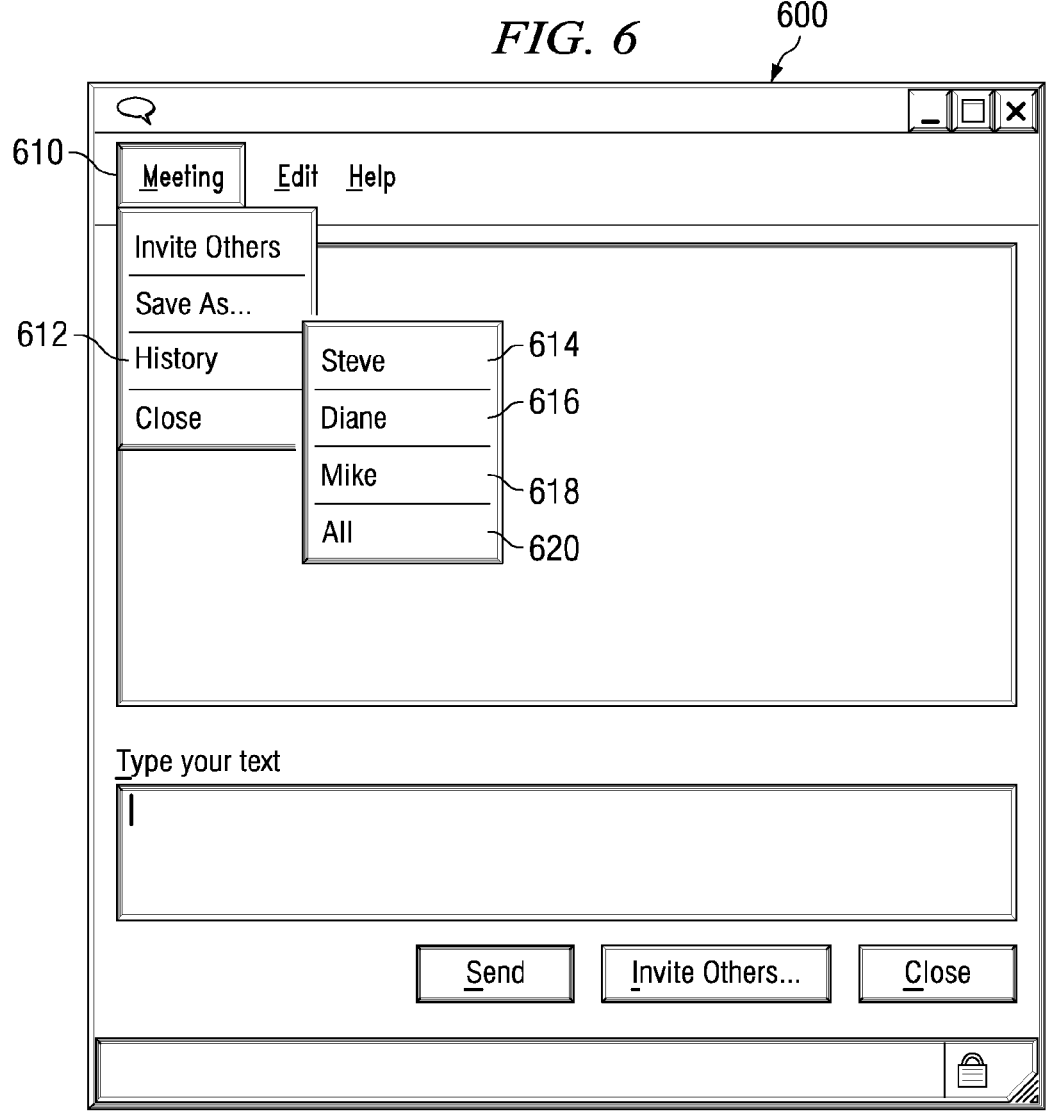
FIG. 6 is a dialog window in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200 (Java™ and all Java™-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Turning now to FIG. 3, a block diagram illustrating components used in an instant messaging system is depicted in accordance with an illustrative embodiment. In this illustrative example, a user at instant messaging client 302 may send or exchange messages with other users at instant messaging clients 304 and 306. These instant messaging clients may be executing on a data processing system, such as data processing system 200 in FIG. 2. The exchange of messages in these examples is facilitated through instant messaging server process 308. This process allows for users to find other users within the instant messaging system as well as to aid in the exchange of messages between different users.

Depending on the particular instant messaging system, instant messaging server process 308 may only be involved in providing an indication of when particular users are online and for establishing initial contacts, while users contacting users already on a buddy list may contact those users directly after seeing that a particular user is online. Instant messaging server process 308 may be located on a server, such as server 104 or 106 in FIG. 1.

In these examples, the different users registered to the instant messaging system are stored in user database 310. This user database provides information needed to search for and find other users as well as to contact users when they are online.

In the illustrative examples, a history of the messages exchanged between parties to a conversation may be sent to a third party without requiring one of the parties to copy and paste all of those messages into the current session. For example, instant messaging client 302 and 304 of FIG. 3 may be part of a current conversation. At some point in time during the conversation, it becomes desirable to add another party at instant messaging client 306. One of the parties at instant messaging client 302 or 304 may indicate the history of the current conversation should be sent to instant messaging client 306 when that party joins the conversation. This indication results in the messages in the current conversation being sent to instant messaging client 306 when that party joins the conversation.

In these examples, the processes are implemented within an instant messaging client, such as instant messaging client 302. Of course, depending on the particular implementation, the processes may be implemented in instant messaging server process 308 if that particular process has access to the messages to the current conversation.

Turning next to FIG. 4, a diagram illustrating components used in an instant messaging system is depicted in accordance with an illustrative embodiment. The different components in FIG. 4 illustrate components that may be found in an instant messaging client, such as instant messaging client 306 in FIG. 3.

In the depicted example, instant messaging application 400 processes messages, such as message 402, received from users located on remote data processing systems. As messages are received, these messages are presented in dialog windows 404. Messages exchanged between instant messaging application 400 and an instant messaging application on a remote data processing system form a conversation in these examples.

Additionally, dialog windows 404 provide an interface for receiving user input to send messages to other users. Contact and control windows 406 is presented by instant messaging application 400 to provide the user with a list of user names, as well as other information, such as, for example, identifying other users that are currently online. Contact and control windows 406 also provide an interface to allow the user to set different preferences. For example, the user may set passwords required to access different names used in instant messaging sessions. Further, a user may employ contact and control windows 406 to set other preferences, such as colors and fonts used in instant messaging application 400.

Further, the list of names presented by contact and control windows 406 is stored in contact list 408 in these examples. Additional user names may be added or deleted from contact list 408. This contact list is employed in presenting the list of names within contact and control windows 406. Additionally, the user may view the status of other users on contact and control windows 406. This status may be, for example, available or busy. When the status is available, instant messaging application 400 will accept messages from another instant messaging application to start a new conversation. When the status of another user is busy, messages from instant messaging application 400 are not accepted by the other application for that user.

Examples of instant messaging application include Lotus Sametime Connect, which is available from International Business Machines Corporation and AOL Instant Messenger, which is available from AOL, LLC.

Message 402 is part of current conversation 414. Current conversation 414 may be viewed through dialog windows 404. Further, a user may store current conversation 414 in history 416 for viewing after the conversation has been terminated. When a user in instant messaging application 400 invites another party to the conversation, this invitation may be made though contact and control windows 406. The illustrative embodiments allow the user to send current conversation 414 to the new party. In this manner, all the messages part of current conversation 414 are sent to the new party without having to repeat those messages for the parties currently in the conversation.

Turning now to FIG. 5, a diagram of a dialog window is depicted in accordance with an illustrative embodiment. In this example, dialog window 500 illustrates a user interface that may be used to send a chat history to an invitee that is added to a meeting that is ongoing. In this example, dialog window 500 is used to invite another party to a meeting that is currently in progress. The topic of the meeting may be entered in field 502 with a message entered in field 504. The invitees to the meeting are found in section 506. Additional invitees may be added by selecting add invitees button 508. Selecting this button causes contacts to be presented in which one or more contacts may be selected to add invitees to the meeting. Additionally, in these illustrative embodiments, checkbox 510 allows a user to send a history of the messages already exchanged between parties in the current conversation to a set of one or more invitees listed in section 506.

By selecting checkbox 510, the history of the conversation is sent to these invitees. In these illustrative examples, the history is sent when the invitees join the conversation. The invitation is sent by selecting send button 512. Cancel button 514 is used to cancel the process in this example. Dialog window 500 is an example of one manner in which history may be designated or indicated to be sent to another party. In this particular example, the party is to an invitee who joins the conversation. The history of messages already exchanged may be sent in other ways, depending on the particular implementation. For example, the history of messages may be sent at any time to any participants of the conversation.

Turning now to FIG. 6, a dialog window is depicted in accordance with an illustrative embodiment. Dialog window 600 is an example of a chat window. A user may select a command from menu 610 to send the history to one or more participants in the conversation. In this example, menu 610 includes history command 612, which allows the user to send the history of messages in the conversation to any of the current parties to the conversation. In this particular example, three parties are shown in entries 614, 616, and 618. The user may select any one of these parties. As a result, the history is sent to the selected parties. Further, the user also may select all 620 to send history to all the parties. Of course, a subset of the parties could be selected through this menu depending on the particular implementation.

Figure 7:
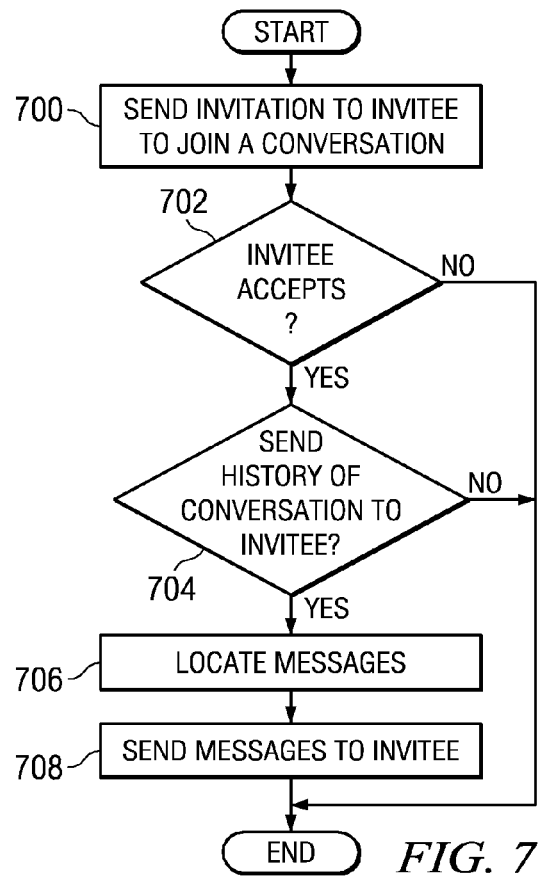
FIG. 7 is a flowchart of a process for adding a party to a conversation in accordance with an illustrative embodiment.

Turning now to FIG. 7, a flowchart of a process for adding a party to a conversation is depicted in accordance with an illustrative embodiment. This process may be implemented in an instant messaging application, such as instant messaging application 400 of FIG. 4.

The process begins by sending an invitation to an invitee to join a conversation (step 700). The invitee is a third party that may join the current conversation. In these examples, step 700 occurs after the conversation has begun. Next, the process determines if the invitee accepts the invitation (step 702). If the invitee accepts the invitation in step 702, a further determination is made to send the history of the conversation to the invitee (step 704). If the conversation history is to be sent to the invitee in step 704, the messages are located (step 706) and sent to the invitee (step 708) with the process terminating thereafter.

Turning back to the determination made in step 704, if the history is not to be sent to the invitee, the process terminates. Turning further back to the determination made in step 702, if the invitee declines the invitation to join the meeting, the process also terminates without sending the history.

Figure 8:
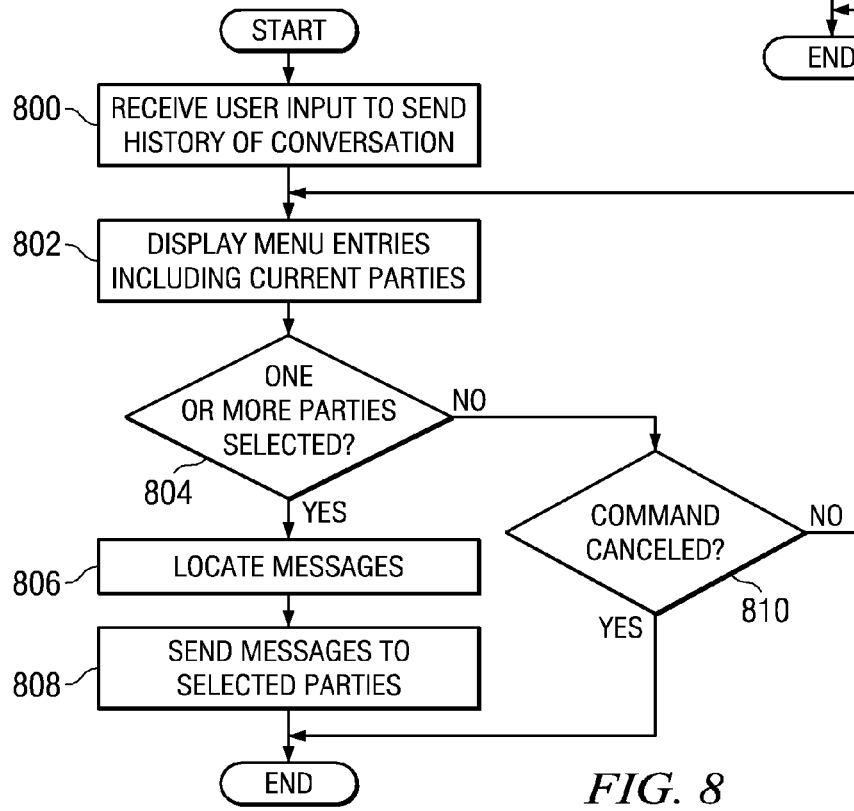
FIG. 8 is a flowchart of a process for sending conversation history to a party in accordance with an illustrative embodiment.

Turning now to FIG. 8, a flowchart of a process for sending conversation history to a party is depicted in accordance with an illustrative embodiment. This process may be implemented in an instant messaging application, such as instant messaging application 400 of FIG. 4.

The process begins by receiving user input to send the history of a conversation to an invitee (step 800). The user input may be received through a user interface, such as dialog window 600 in FIG. 6. A menu is displayed to include entries identifying current parties to the conversation (step 802). The entries for current parties are entries that identify all of the parties that are currently part of the conversation. A party does not have to be actively sending messages to be part of the conversation. In these depicted examples, a party is part of the conversation if the party has sent or received a message from another party in the conversation. If a party has left the conversation that party is not shown in this menu.

A determination is made as to whether one or more parties are selected (step 804). If a party is selected in step 804, the messages are located (step 806) and sent to the selected parties (step 808). In the depicted examples, the messages are all of the messages that have been sent and received in the conversation up to the time that a set of one or more parties are selected to received the history.

Turning back to the determination made in step 804, if a party is not selected, the process further determines if the command was cancelled (step 810). If the command was cancelled, the process terminates. If the command was not cancelled, the process returns to step 802 to display menu entries including current parties to the conversation.

Thus, the illustrative embodiments provide a computer implemented method, apparatus, and computer usable program code for managing messages for an instant messaging conversation. A determination is made as to whether the selected party should receive messages already exchanged in the instant messaging conversation in response to a user input during the instant messaging conversation with respect to a selected party. The messages are sent to the selected party in response to a determination that the selected party should receive the plurality of messages.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable data storage device providing program code for use by or in connection with a computer or any instruction execution system. For the purposes of this description, a computer-usable or computer readable data storage device can be any tangible apparatus that can, store the program for use by or in connection with the instruction execution system, apparatus, or device.

The computer readable data storage device can be an electronic, magnetic, optical, or semiconductor system (or apparatus or device) but does not encompass propagation media. Examples of a computer-readable data storage device include a semiconductor or solid state memory, magnetic tape, a removable computer diskette, a random access memory (RAM), a read-only memory (ROM), a rigid magnetic disk and an optical disk. Current examples of optical disks include compact disk - read only memory (CD-ROM), compact disk - read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing messages for an instant messaging conversation, the computer implemented method comprising:

displaying a menu in a window on a graphical user interface of a user for the instant messaging conversation, the menu including one or more selectable fields displayed in association with one or more user names associated with each of a plurality of selected parties;

responsive to a user input during the instant messaging conversation, sending, by a processing unit, an invitation to each of the plurality of selected parties for the plurality of selected parties to join the instant messaging conversation;

determining, for each of the plurality of selected parties, whether the user selected a command in the menu indicating that a plurality of messages already exchanged in the instant messaging conversation be sent to a selected party in the plurality of selected parties that joins the instant messaging conversation, including determining whether a selectable field of the one or more selectable fields displayed in association with the user name for the selected party was selected by the user wherein the plurality of messages are messages already exchanged in the instant messaging conversation between the user and at least one other party;

responsive to a determination that the user selected the command in the menu indicating that the plurality of messages be sent to the selected party in the plurality of selected parties that joins the instant messaging conversation and responsive to receiving an acceptance of the invitation from the selected party, sending the plurality of messages at a selectable time to only parties in the plurality of selected parties for which the command in the menu was selected; and responsive to detecting that the selected party has declined the invitation to join the instant messaging conversation, not sending the plurality of messages to the selected party.

2. The computer implemented method of claim 1, wherein the user input is an invitation to the selected party to join the instant messaging conversation.

3. The computer implemented method of claim 1 wherein determining, for each of the plurality of selected parties, whether the user selected the command in the menu indicating that the plurality of messages be sent to the selected party in the plurality of selected parties that joins the instant messaging conversation further comprises:

determining whether a selectable field of the one or more selectable fields displayed in association with the user name for the selected party was selected by the user; and responsive to a determination that the selectable field of the one or more selectable fields displayed in association with the user name for the selected party was selected by the user, identifying the selectable time to send.

4. The computer implemented method of claim 1, wherein the command is selected in a dialog window used to invite parties to the instant messaging conversation.

5. The computer implemented method of claim 1, wherein the user input is a selection of the selected party to receive the plurality of messages.

6. The computer implemented method of claim 5, wherein the selection of the selected party is made using a menu in an instant messaging application.

7. The computer implemented method of claim 1, wherein the plurality of messages is all of the messages already exchanged during the instant messaging conversation.

8. The computer implemented method of claim 1, wherein determining whether the user requested that the plurality of messages be sent to the selected party and sending the plurality of messages to the selected party are performed by an instant messaging application on a client.

9. A computer program product comprising:
a computer readable data storage device storing computer usable program code for managing messages for an instant messaging conversation;
computer usable program code for displaying a menu in a window on a graphical user interface of a user for the instant messaging conversation, the menu including one or more selectable fields displayed in association with one or more user names associated with each of a plurality of selected parties;
computer usable program code, responsive to a user input during the instant messaging conversation, for sending an invitation to each of the plurality of selected parties for the plurality of selected parties to join the instant messaging conversation;
computer usable program code for, determining for each of the plurality of selected parties, whether the user selected a command in the menu indicating that a plurality of messages already exchanged in the instant messaging conversation be sent to a selected party in the plurality of selected parties that joins the instant messaging conversation, including determining whether a selectable field of the one or more selectable fields displayed in association with the user name for the selected party was selected by the user wherein the plurality of messages are messages already exchanged in the instant messaging conversation between the user and at least one other party;
computer usable program code, responsive to a determination that the user selected the command in the menu indicating that the plurality of messages be sent to the selected party in the plurality of selected parties that joins the instant messaging conversation and responsive to receiving an acceptance of the invitation from the selected party, for sending the plurality of messages at a selectable time to only selected parties in the plurality of selected parties for which the command in the menu was selected; and
computer usable program code responsive to detecting that the selected party has declined the invitation to join the instant messaging conversation, for not sending the plurality of messages to the selected party.

10. The computer program product of claim 9, wherein the user input is an invitation to the selected party to join the instant messaging conversation.

11. The computer program product of claim 9 wherein the computer usable program code for determining, for each of the plurality of selected parties, whether the user selected the command in the menu indicating that the plurality of messages be sent to the selected party in the plurality of selected parties that joins the instant messaging conversation comprises:

computer usable program code for determining whether a selectable field of the one or more selectable fields displayed in association with the user name for the selected party was selected by the user; and responsive to a determination that the selectable field of the one or more selectable fields displayed in association with the user name for the selected party was selected by the user, identifying the selectable time to send.

12. The computer program product of claim 9, wherein the command is selected in a dialog window used to invite parties to the instant messaging conversation.

13. The computer program product of claim 9, wherein the user input is a selection of the selected party to receive the plurality of messages.

14. The computer program product of claim 13, wherein the selection of the selected party is made using a menu in an instant messaging application.

15. The computer program product of claim 9, wherein the plurality of messages is all of the messages already exchanged during the instant messaging conversation.

16. The computer program product of claim 9, wherein the computer usable program code is for an instant messaging application.

17. A data processing system comprising:
a bus;
a communications unit connected to the bus;
a storage device connected to the bus, wherein the storage device includes a set of computer usable program code; and a processor unit connected to the bus, wherein a processor in the processor unit executes the computer usable program code to display a menu in a window on a graphical user interface of a user for an instant messaging conversation, the menu including one or more selectable fields displayed in association with one or more user names associated with each of a plurality of selected parties;

send an invitation to each of the plurality of selected parties for the plurality of selected parties to join an instant messaging conversation in response to a user input during the instant messaging conversation;

determine, for each of the plurality of selected parties, whether the user selected a command in the menu indicating that a plurality of messages already exchanged in the instant messaging conversation be sent to a selected party in the plurality of selected parties that joins the instant messaging conversation, wherein the plurality of messages are messages already exchanged in the instant messaging conversation between the user and at least one other party;

send the plurality of messages at a selectable time to only parties in the plurality of selected parties for which the command in the menu was selected in response to a determination that the user selected the command in the menu indicating that the plurality of messages be sent to the selected party in the plurality of selected parties that joins the instant messaging conversation and in response to receiving an acceptance of the invitation from the selected party; and not send the plurality of messages to the selected party in response to detecting that the selected party has declined the invitation to join the instant messaging conversation.

18. The data processing system of claim 17, wherein the user input is an invitation to the selected party to join the instant messaging conversation.

19. The data processing system of claim 17 wherein the processor further executes the computer usable program code to determine, for each of the plurality of selected parties, whether the user selected the command in the menu indicating that the plurality of messages be sent to the selected party in the plurality of selected parties that joins the instant messaging conversation, the processor unit further executes the computer usable program code to determine whether a selectable field of the one or more selectable fields displayed in association with a user name for the selected party was selected by the user; and responsive to a determination that the selectable field of the one or more selectable fields displayed in association with the user name for the selected party was selected by the user, identifying the selectable time to send.

20. The data processing system of claim 17, wherein the command is selected in a dialog window used to invite parties to the instant messaging conversation.

21. The data processing system of claim 17, wherein the user input is a selection of the selected party to receive the plurality of messages.

22. The data processing system of claim 21, wherein the selection of the selected party is made using a menu in an instant messaging application.

23. The data processing system of claim 17, wherein the plurality of messages is all of the messages already exchanged during the instant messaging conversation.

24. A method for managing messages for an instant messaging conversation, the computer implemented method comprising:

displaying a menu in a window on a graphical user interface of a user for the instant messaging conversation, the menu including one or more selectable fields displayed in association with one or more user names associated with each of the plurality of selected parties;

responsive to a user input during the instant messaging conversation, sending, by a processing unit, an invitation to each of a plurality of selected parties for the plurality of selected parties to join the instant messaging conversation;

determining, for each of the plurality of selected parties, whether the user selected a command in a menu indicating that a plurality of messages already exchanged in the instant messaging conversation be sent to a selected party in the plurality of selected parties that joins the instant messaging conversation by determining whether a selectable field of the one or more selectable fields displayed in association with a user name for the selected party was selected by the user, wherein the plurality of messages are messages already exchanged in the instant messaging conversation between the user and at least one other party;

responsive to a determination that the selectable field was selected by the user determining that the user selected the command in the menu indicating that the plurality of messages be sent to the selected party in the plurality of selected parties;

responsive to determining that the user selected the command in the menu indicating that the plurality of messages be sent to the selected party in the plurality of selected parties and responsive to receiving an acceptance of the invitation from the selected party, sending the plurality of messages to only parties in the plurality of parties for which the command in the menu was selected; and responsive to detecting that the selected party has declined the invitation to join the instant messaging conversation, not sending the plurality of messages to the selected party.

25. The method of claim 24, wherein selection of the selectable field in the window on the graphical user interface of the user for the instant messaging conversation indicates that the user has requested that the plurality of messages already exchanged in the instant messaging conversation be sent to a party that joins the instant messaging conversation.

* * * * *